US009892211B2

(12) United States Patent
Yoshino et al.

(10) Patent No.: US 9,892,211 B2
(45) Date of Patent: Feb. 13, 2018

(54) SEARCHABLE CODE PROCESSING SYSTEM AND METHOD

(71) Applicant: HITACHI, LTD., Tokyo (JP)

(72) Inventors: Masayuki Yoshino, Tokyo (JP); Hisayoshi Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 14/451,469

(22) Filed: Aug. 5, 2014

(65) Prior Publication Data

US 2015/0046450 A1 Feb. 12, 2015

(30) Foreign Application Priority Data

Aug. 8, 2013 (JP) ................................ 2013-165187

(51) Int. Cl.
*G06F 17/30* (2006.01)
*H04L 9/00* (2006.01)
*H04L 9/06* (2006.01)

(52) U.S. Cl.
CPC .... *G06F 17/30979* (2013.01); *G06F 17/3079* (2013.01); *H04L 9/008* (2013.01); *H04L 9/06* (2013.01)

(58) Field of Classification Search
CPC .. G06F 21/71; G06F 21/78; G06F 2221/2107; G06F 17/30483; G06F 17/30979; G06F 21/6209; G06F 17/3069; G06F 17/30864; G06F 17/3079; H04L 9/00; H04L 9/0822; H04L 9/008; H04L 9/06

(Continued)

(56) References Cited

U.S. PATENT DOCUMENTS 7,139,679 B1 * 11/2006 McGrew ............. H04L 63/1458
702/186
7,636,439 B2 * 12/2009 Nakabayashi ........ H04L 9/0662
380/44

(Continued)

FOREIGN PATENT DOCUMENTS

JP          2012-123614 A      6/2012

OTHER PUBLICATIONS

Dawn Xiaodong Song et al., "Practical Technique for Searches on Encrypted Data", Proceedings of the 2000 IEEE Symposium on Security and Privacy, 2000, pp. 44-55.

*Primary Examiner* — Thanh-Ha Dang
(74) *Attorney, Agent, or Firm* — Mattingly & Malur, PC

(57) ABSTRACT

In a searchable cipher system, the security of ciphertext, the optimization of the size of ciphertext and the optimization of the network traffic are not examined enough. A registration client deposits encrypted data acquired by compressing the size of a search tag created for a search by a stochastic encryption using a mask by a hash value and an output value of a homomorphic function in a server, a search client similarly stochastically encrypts a search keyword and transmits it to the management server as a search keyword acquired by encrypting only a part of the encrypted data, the search client requests the management server to search data to be searched without making the management server release a mask by random numbers of the encrypted data and the encrypted keyword, the search client detects a wrong search in a search result, and decrypts the search result.

13 Claims, 14 Drawing Sheets

(58) Field of Classification Search
USPC .......................................................... 707/736
See application file for complete search history.

(56) References Cited

U.S. PATENT DOCUMENTS

| | | | | |
|---|---|---|---|---|
| 8,938,068 B2* | 1/2015 | Kobayashi | ............ | H04L 9/3073 380/28 |
| 2007/0140479 A1* | 6/2007 | Wang | ............ | H04L 9/008 380/30 |
| 2007/0244951 A1* | 10/2007 | Gressel | ............ | G06F 7/582 708/252 |
| 2009/0119510 A1* | 5/2009 | Long | ............ | H04L 9/0631 713/171 |
| 2012/0163588 A1* | 6/2012 | Kobayashi | ............ | H04L 9/0847 380/28 |
| 2012/0215845 A1* | 8/2012 | Aad | ............ | G06Q 10/1093 709/204 |
| 2012/0297201 A1* | 11/2012 | Matsuda | ............ | G06F 21/6245 713/189 |
| 2012/0324240 A1* | 12/2012 | Hattori | ............ | G06F 21/6227 713/189 |
| 2013/0262863 A1 | 10/2013 | Yoshino et al. | | |
| 2013/0287210 A1* | 10/2013 | Matsuda | ............ | H04L 9/0894 380/44 |
| 2013/0318351 A1* | 11/2013 | Hirano | ............ | H04L 9/3073 713/168 |
| 2013/0346741 A1* | 12/2013 | Kim | ............ | H04L 9/008 713/155 |
| 2014/0185794 A1* | 7/2014 | Yasuda | ............ | H04L 9/008 380/28 |
| 2014/0233727 A1* | 8/2014 | Rohloff | ............ | H04L 9/008 380/28 |
| 2014/0298009 A1* | 10/2014 | Hattori | ............ | H04L 9/3073 713/155 |

* cited by examiner

F I G. 1
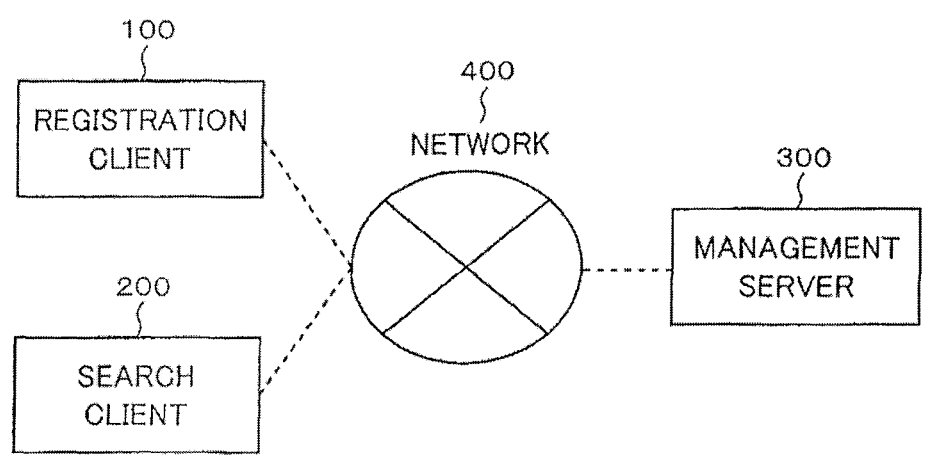

F I G. 6A
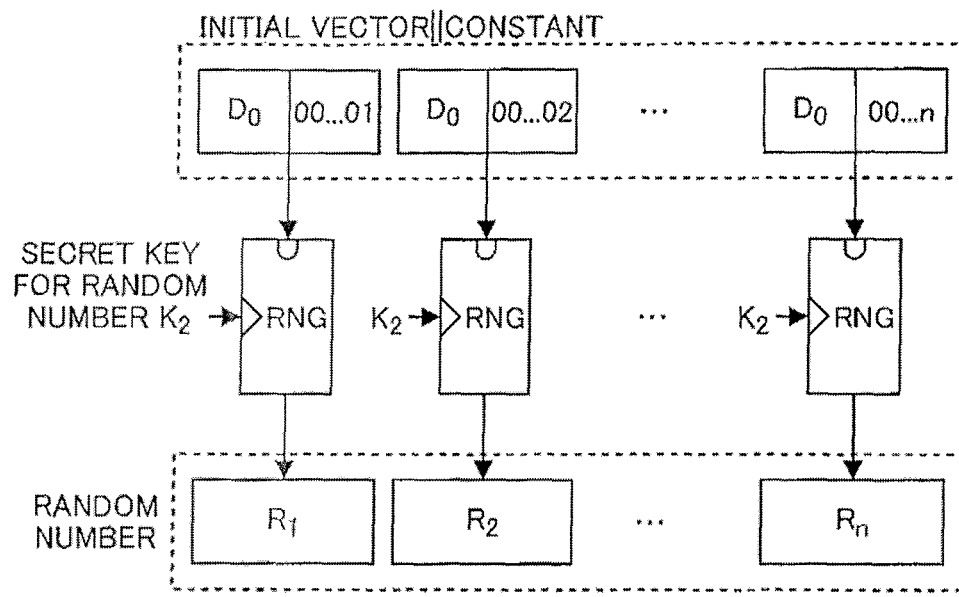
F I G. 6B
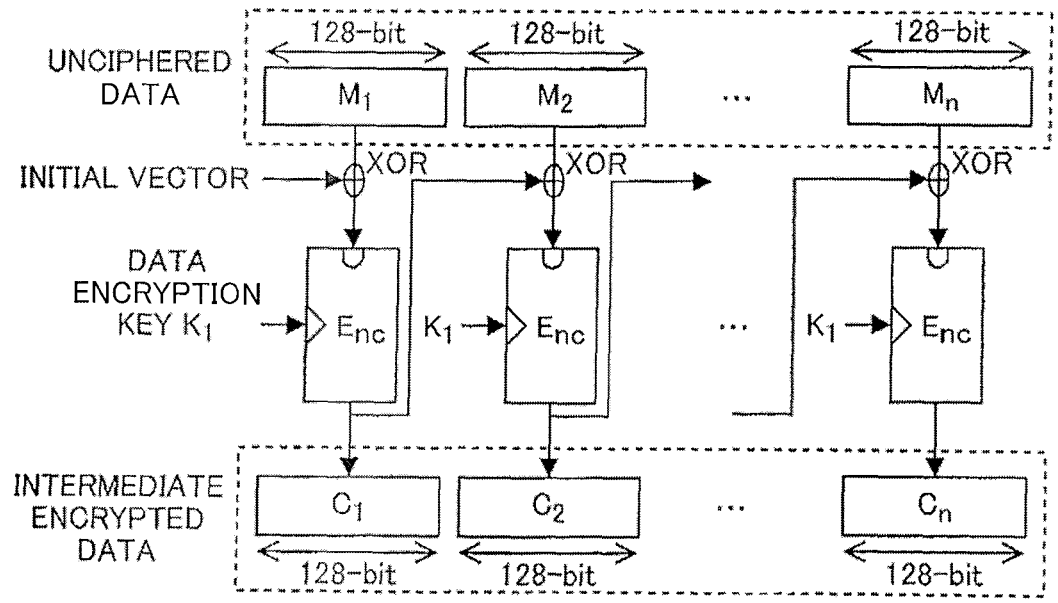

F I G. 7
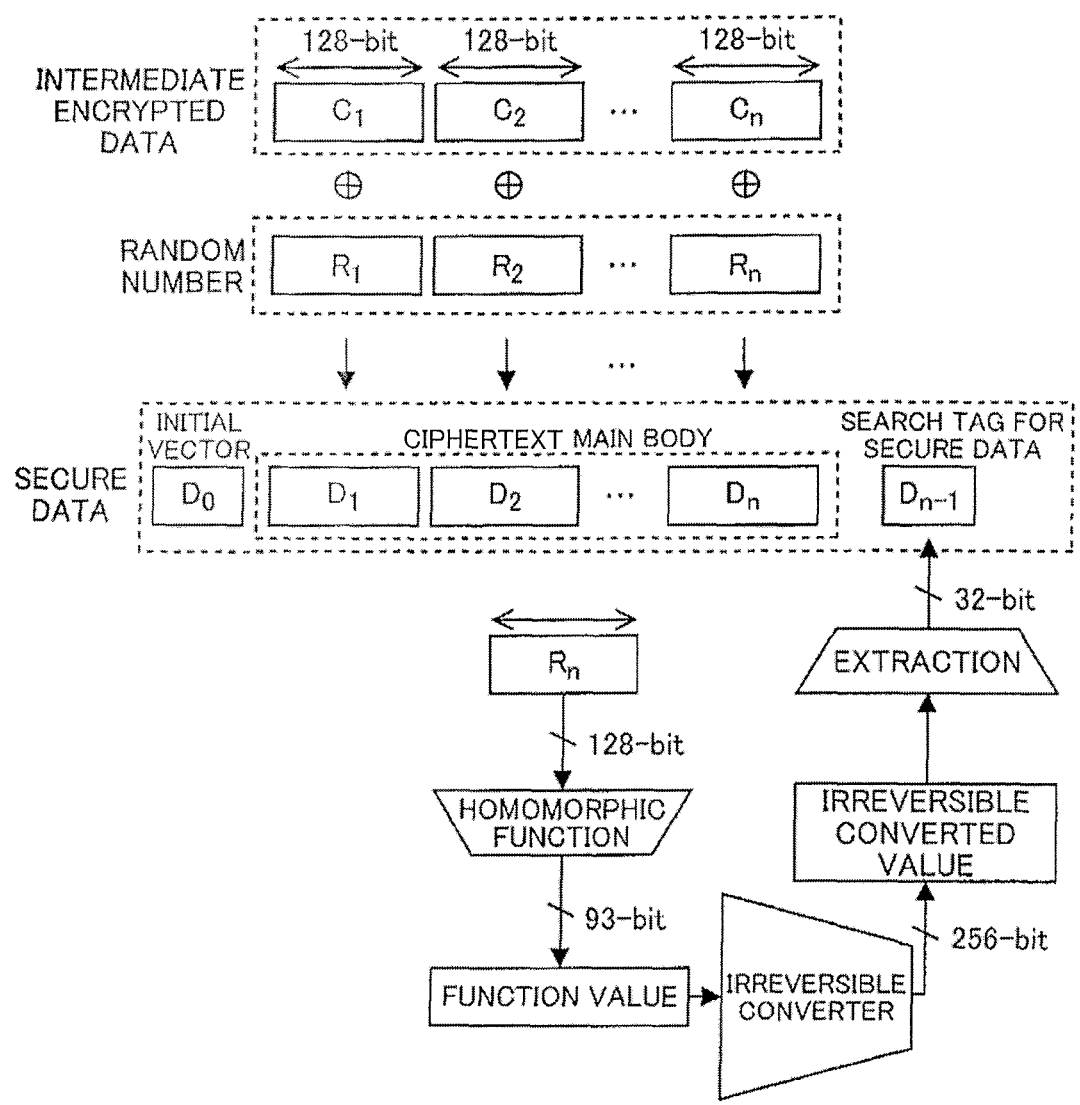

F I G. 8
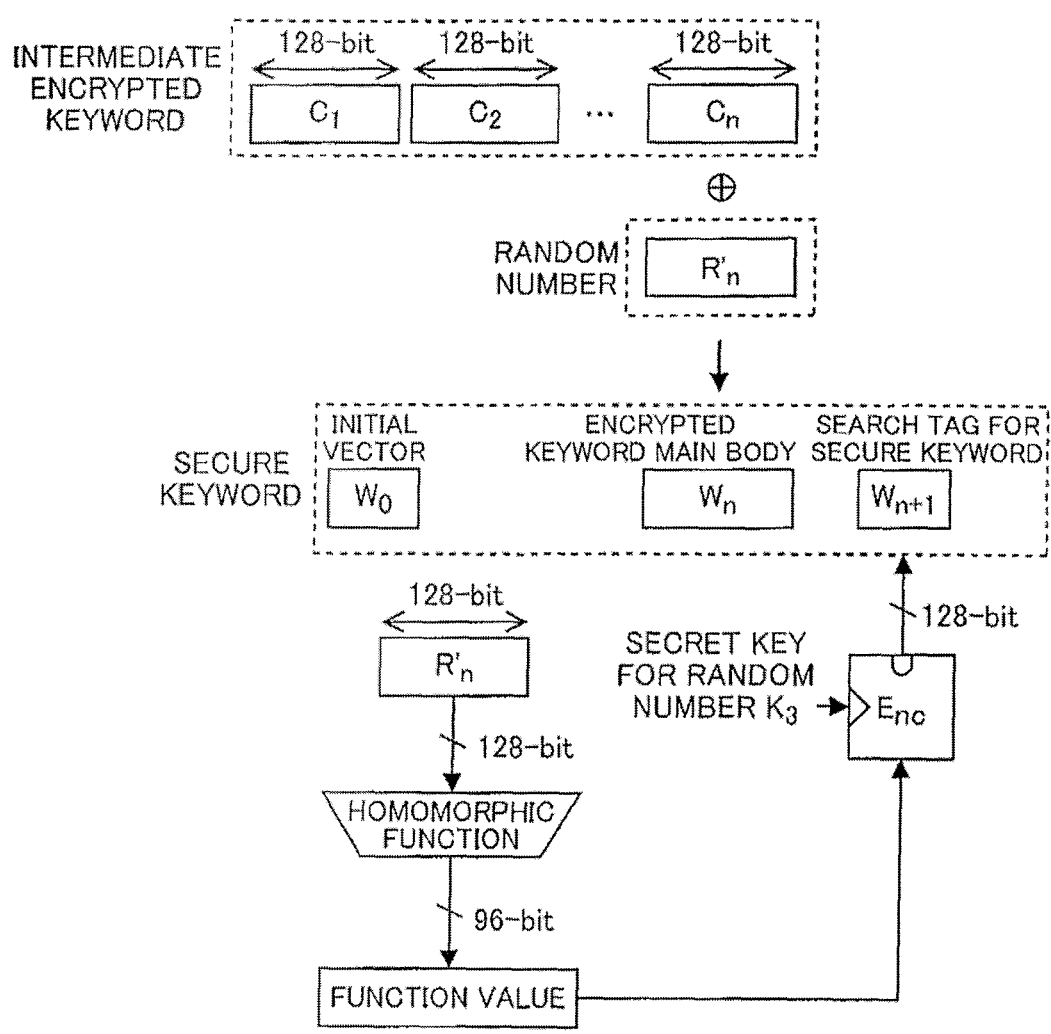

F I G. 1 0
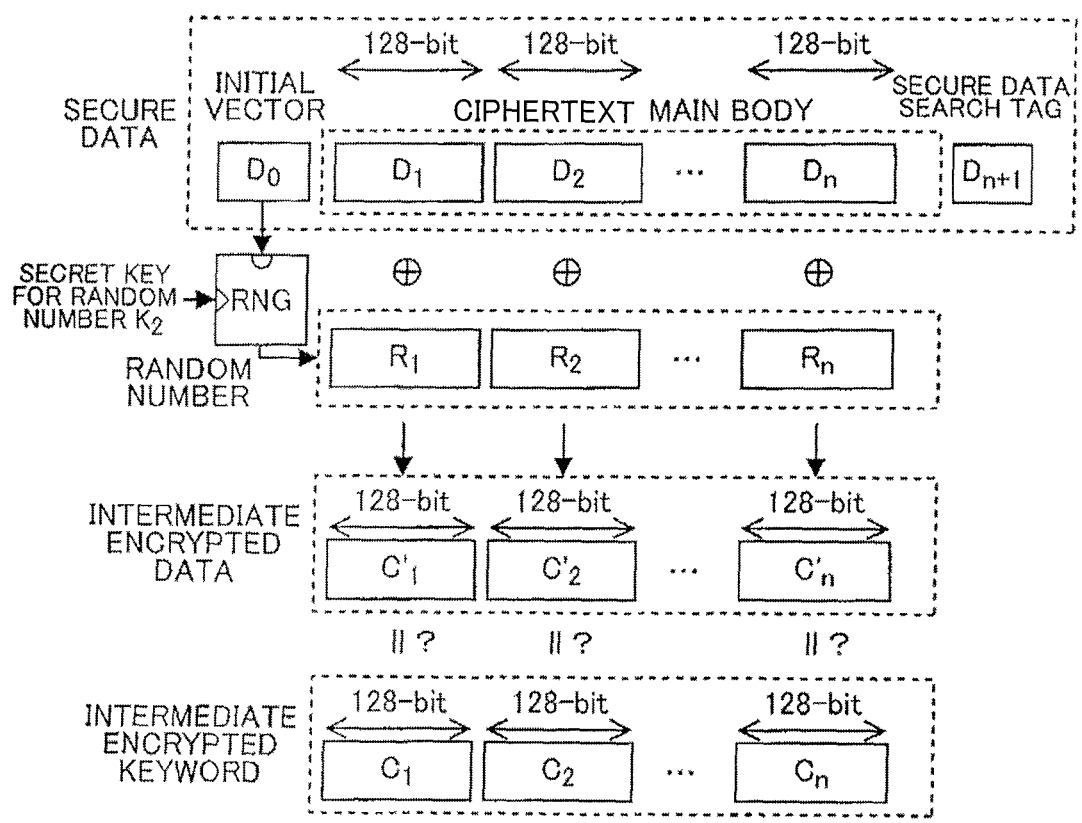

F I G. 1 1
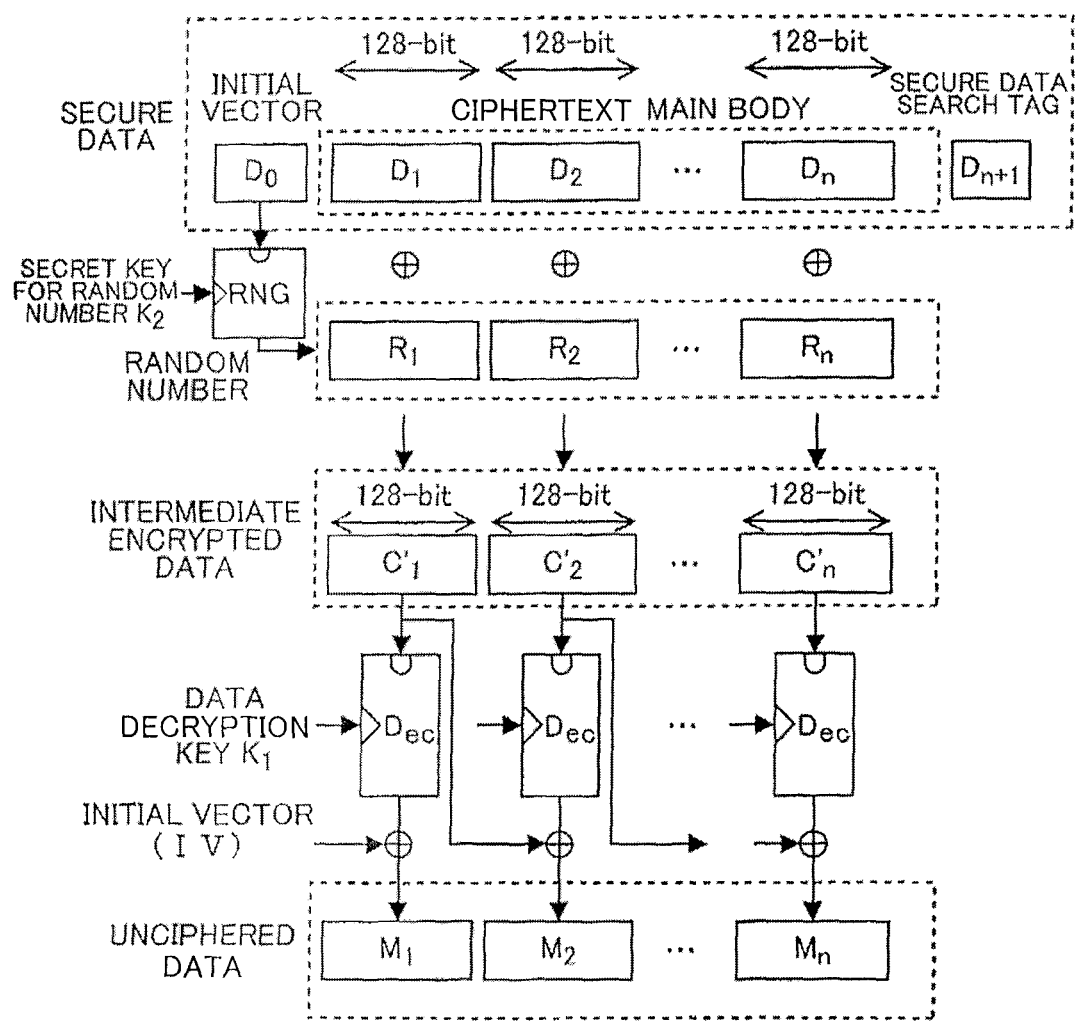

F I G. 1 4
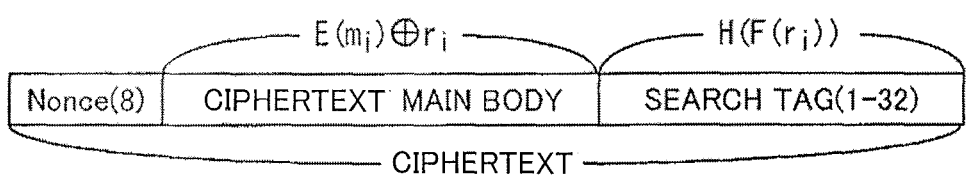
F I G. 1 5
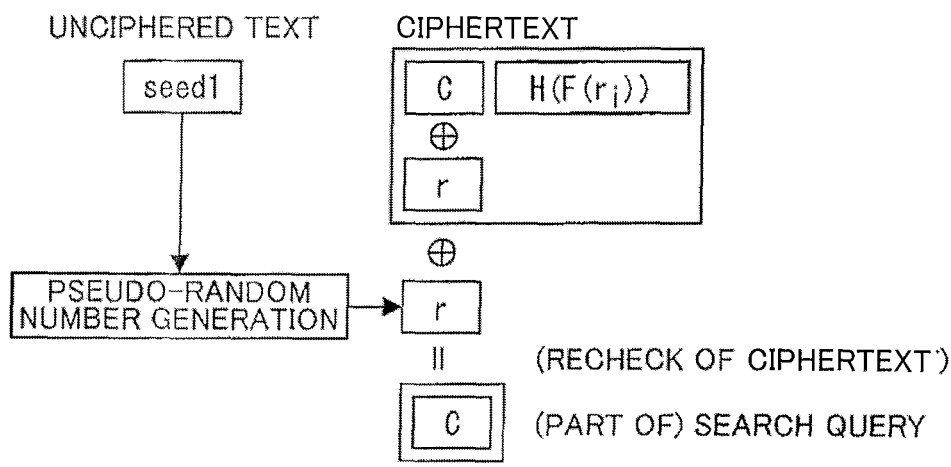

SEARCHABLE CODE PROCESSING SYSTEM AND METHOD

CLAIM OF PRIORITY

The present application claims priority from Japanese application JP 2013-165187 filed on Aug. 8, 2013, the content of which is hereby incorporated by reference into this application.

FIELD OF THE INVENTION

The present invention relates to a searching system and a searching method where a server searches deposited encrypted data without decrypting the encrypted data according to a request of a client in a server/client model.

BACKGROUND OF THE INVENTION

Attention is recently paid to application management configuration called a cloud and utilizing an information system not maintained by its own organization but provided by another organization so as to enhance the efficiency of management expenses for the development and the application of the information system. In the meantime, since an organization that manages the information system is different from an organization that utilizes the information system in the cloud, it is difficult to take measures to prevent information leakage and others, to find a cause after the occurrence of an accident, and to prevent recurrence in only its own organization. Therefore, for measures to prevent an unjust outflow of data beforehand, encrypting technique is required to be utilized and the confidentiality of data is required to be secured.

In the server/client model, for technique for preventing the leakage of data deposited in a server while a client deposits data in the server, a method utilizing encryption technique is known. For example, in Dawn Xiaodong Song, David Wagner, Arian Perrig. "Practical Techniques for Searches on Encrypted Data", In Proceedings of the 2000 IEEE Symposium on Security and Privacy, pages 44-55 (2000) and JP-A No. 2012-123614, a method of searching deposited encrypted data without decrypting the encrypted data according to a request of a client is described. In this search method, a stochastic encryption system which is more secure than a definite encryption system having the one-to-one simple correlation of unciphered text and ciphertext and which has the one-to-m complex correlation of unciphered text and ciphertext is adopted, and techniques for securely searching data deposited in a server while preventing information leakage to a server manager are disclosed.

SUMMARY OF THE INVENTION

However, in the technique described in "Practical Techniques for Searches on Encrypted Data", since the definite encryption system low in security is used for encrypting a search keyword from the client, the technique is vulnerable to unjust attack such as frequency analysis. In the meantime, in the technique disclosed in JP-A No. 2012-123614, both deposited unciphered data and a search keyword are stochastically encrypted and they are secure. However, the reduction of the size of ciphertext is not sufficiently examined. For example, when unciphered text of 128 bits is encrypted using Advanced Encryption Standard (AES) encryption (output length: 128 bits) which is a standard encryption system and Secure Hash Algorithm (SHA) 256 encryption (output length: 256 bits) of 256 bits which is a standard encryption hash function, the size of encrypted data deposited in a server is 384 bits (128 bits+256 bits) or more acquired by summing respective output length of the AES encryption and the SHA256 hash function. That is, data size is three times larger than 128 bits before the encryption. Also, as for the encryption of a search keyword, the reduction of data size is not examined sufficiently. Concretely, when a search keyword is encrypted, ciphertext having the similar length is created. This ciphertext is transmitted/received via a network. Accordingly, when the size of the search keyword is large, a load is applied to the network between a client and a server.

To settle the problem, in a searchable code processing system, a management server that deposits data, a registration client that deposits the data in the management server and a search client that requests the management server to search the data are linked via a network, the registration client deposits encrypted data acquired by compressing the size of a search tag created for a search in the server while using a stochastic encryption system using a mask by a hash value and an output value of a homomorphic function, the search client transmits a search keyword efficiently compressed and encrypted to the management server while similarly using stochastic encryption for encrypting a keyword for a search, the management server is requested to output data acquired by the search as a search result without making the management server release a mask by random numbers of the encrypted data and the encrypted keyword, the search client detects a wrong search in the search result, and the search client decrypts the search result.

As the size of the encrypted data deposited in the management server by the client is small, a storage in the management server can be efficiently utilized. As the size of the search keyword encrypted for the search can also be reduced, traffic in the network can be inhibited. Further, even if the management server makes a wrong search, the client can detect an error in the search result.

BRIEF DESCRIPTION OF THE DRAWINGS

FIG. 1 shows an outline of a searchable code processing system;

FIGS. 6A and 6B show a method of generating a random number and an encrypting method;

FIG. 7 is a block diagram showing a procedure for generating secure data in the registration client;

FIG. 8 is a block diagram showing a procedure for generating a secure keyword in the search client;

FIG. 10 is a block diagram showing a procedure for detecting the wrong search of the secure data in the search client;

FIG. 11 is a block diagram showing a procedure for decrypting the secure data in the search client;

FIG. 14 shows a format of ciphertext; and

FIG. 15 shows a process for detecting a search error.

DETAILED DESCRIPTION OF THE PREFERRED EMBODIMENT

Figure 2:
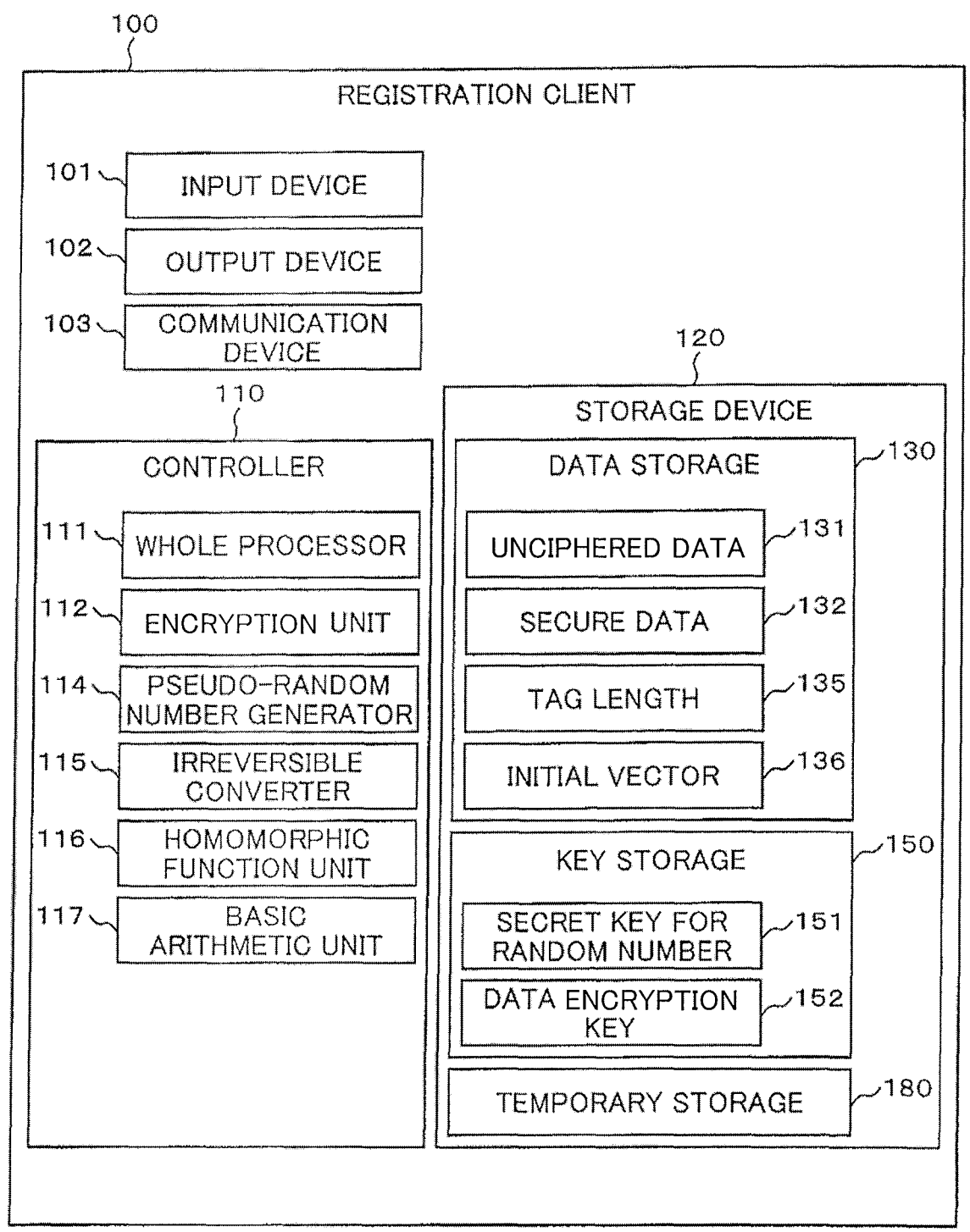
FIG. 2 shows an outline of functions of a registration client.

Referring to the drawings, an embodiment of the present invention will be described in detail below.

FIG. 1 is a schematic drawing showing a searching system in this embodiment. As shown in FIG. 1, the searching system is provided with a registration client 100, a search client 200 and a management server 300, and a pair of the registration client 100 and the management server 300 and a pair of the search client 200 and the management server 300 are configured so that the pair can mutually transmit/receive information via a network 400.

In this case, the registration client 100 in this embodiment functions as a transmitter-receiver for registering data that transmits secure data to the management server 300, the search client 200 functions as a transmitter-receiver for a search that transmits a secure keyword to the management server 300 and receives a result of a search, and the management server 300 functions as a transmitter-receiver that stores the secure data in a database 341 and searches data in the database 341.

FIG. 2 is a schematic diagram showing functions of the registration client 100. As shown in FIG. 2, the registration client 100 is provided with a controller 110, a storage device 120, an input device 101, an output device 102 and a communication device 103.

The storage device 120 is provided with a data storage 130, a key storage 150 and a temporary storage 180.

In the data storage 130, unciphered text which is data to be transmitted to the management server 300 is stored. In this embodiment, unciphered data 131 accepted via the input device 101 and secure data 132 to be registered in the management server 300 are stored. Besides, tag length 135 which means the data length of a part of the secure data 132 is stored. In addition, an initial vector 136 used in generating the secure data 132 is stored. The key storage 150 stores a secret key 151 for a random number and a data encryption key 152 which the registration client 100 should confidentially manage from a viewpoint of security. The temporary storage 180 stores information required for processing in the controller 110.

The controller 110 is provided with a whole processor 111, an encryption unit 112, a pseudo-random number generator 114, an irreversible converter 115, a homomorphic function unit 116 and a basic arithmetic unit 117.

The whole processor 111 controls all processing in the registration client 100. For example, in this embodiment, the whole processor 111 stores information the input of which the whole processor accepts via the input device 101 in the data storage 130 as unciphered data 131. Besides, in this embodiment, the whole processor 111 instructs the output device 102 to display the unciphered data 131.

In addition, in this embodiment, the whole processor 111 reads unciphered data 131 stored in the data storage 130, respectively inputs it to the encryption unit 112, the pseudo-random number generator 114, the irreversible converter 115, the homomorphic function unit 116 and the basic arithmetic unit 117, and stores output data in the data storage 130 as secure data 132.

Moreover, in this embodiment, the whole processor 111 transmits the secure data 132 to the management server 300 via the communication device 103. Further, in this embodiment, the whole processor 111 stores secure data 132 received from the management server 300 via the communication device 103 in the temporary storage 180 and instructs the output device 102 to display it.

The encryption unit 112 outputs data acquired by encrypting input data. For example, in this embodiment, data and the data encryption key 152 are input from the whole processor 111 to the encryption unit and the encryption unit outputs encrypted data. For example, the encryption unit 112 is realized by installing standard encryption algorithm.

The pseudo-random number generator 114 outputs a pseudo-random number. For example, the pseudo-random number generator 114 outputs a random number based upon a physical phenomenon such as temperature, time and electric energy. In this embodiment, the pseudo-random number generator 114 outputs a pseudo-random number using the secret key 151 for a random number input from the whole processor 111. Besides, a data value of the secret key 151 for a random number is updated to a new data value and the new data value is stored in the key storage 150 by the whole processor ill again. For example, the pseudo-random number generator 114 is realized by installing a standard pseudo-random number generation algorithm.

The irreversible converter 115 outputs data acquired by compressing input data. For example, in this embodiment, the irreversible converter converts data input from the whole processor 111 to different data of fixed length (h bits) and outputs it. For example, the irreversible converter 115 that converts input data of arbitrary length to data of 256 bits can be realized by installing an SHA-256 function which is standard cryptographic hash function algorithm.

The homomorphic function unit 116 outputs a result of the output of a homomorphic function based upon input data as data. However, the homomorphic function means a function that meets the following mathematical expression 1 for a function F, an input variable x and an input variable y.

$$F(x \cdot y) = F(x) ? F(y) \qquad \text{(Mathematical expression 1)}$$

However, "·" and "?" denote an operation code, and an operation code for addition, "+", an operation code for multiplication, "*", an operation code for operating XOR (eXclusive OR) which is exclusive-OR every bit, "xor" and others are assigned. At this time, when the operation code for XOR, "xor" is assigned to "·" and "?" in the mathematical expression 1, the following mathematical expression 2 holds.

$$F(x \text{ xor } y) = F(x) \text{ xor } F(y) \qquad \text{(Mathematical expression 2)}$$

The basic arithmetic unit 117 executes processing related to basic arithmetic operation such as addition, subtraction, comparison operation, AND, OR and XOR. For example, in this embodiment, the basic arithmetic unit 117 outputs XOR operation which is exclusive-OR every bit of two data piece input from the whole processor 111 and a result of the verification of whether an equal sign holds in comparison operation or not as data.

Figure 5:
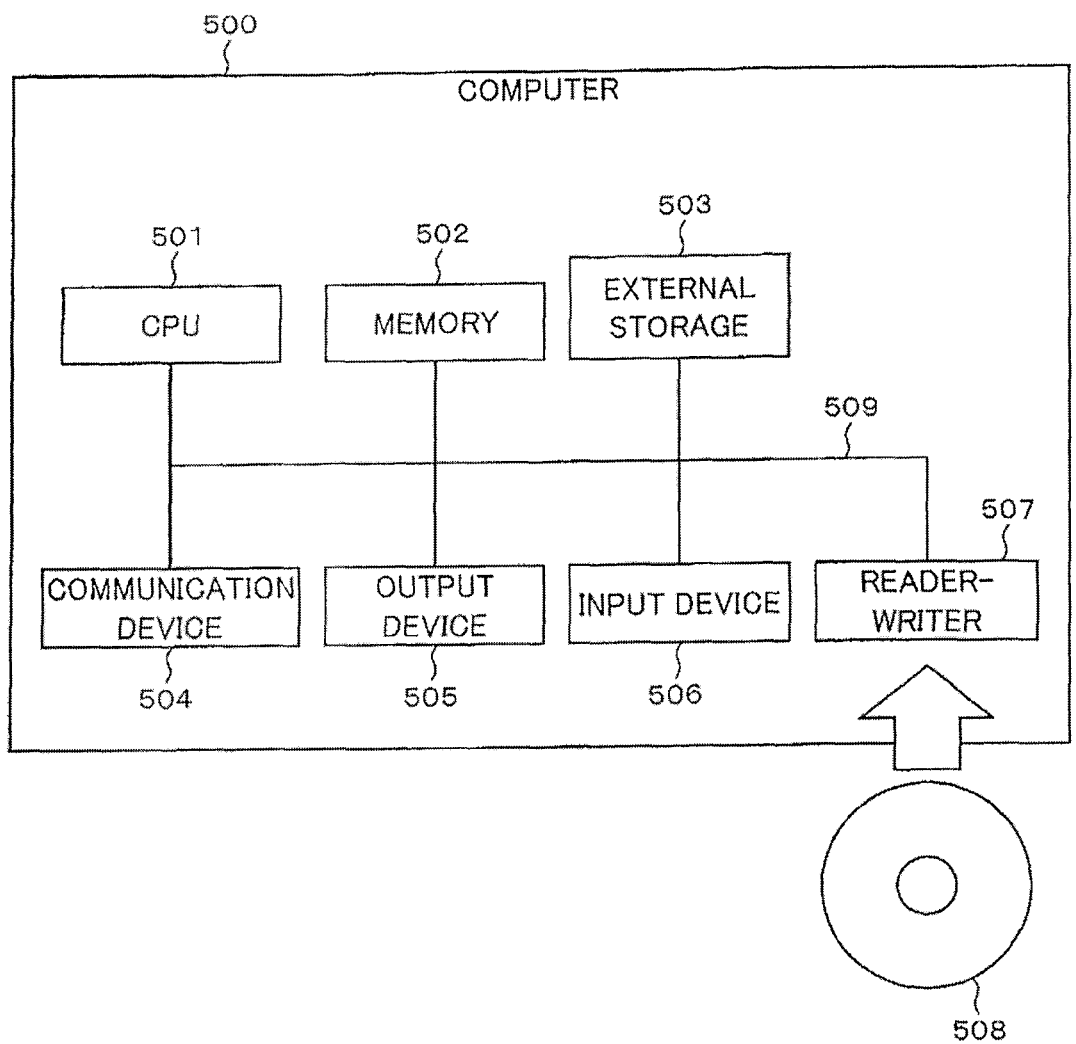
FIG. 5 shows the schematic configuration of a computer.

The abovementioned registration client 100 can be realized by a general computer 500 which is shown in FIG. 5 (a schematic diagram showing the computer) for example and which is provided with a central processing unit (CPU) 501, a memory 502, an external storage 503 such as a hard disk drive (HDD), a reader-writer 507 that reads and writes information from/to a portable storage medium 508 such as a compact disk (CD) and a digital versatile disk (DVD), an input device 506 such as a keyboard and a mouse, an output device 505 such as a display, a communication device 504 such as a network interface card (NIC) for connecting to a communication network and an internal line 509 such as a system bus that connects these devices.

For example, the storage device 120 can be realized when the CPU 501 utilizes the memory 502 or the external storage 503, the controller 110 and each unit included in the controller 110 can be realized by loading a predetermined program stored in the external storage 503 into the memory 502 and executing it in the CPU 501, the input device 101 can be realized when the CPU 501 utilizes the input device 506, the output device 102 can be realized when the CPU 501 utilizes the output device 505, and the communication device 103 can be realized when the CPU 501 utilizes the communication device 504.

The predetermined program is stored (downloaded) in/into the external storage 503 from the storage medium 508 via the reader-writer 507 or from a network via the communication device 504, then, is loaded into the memory 502, and may also be executed by the CPU 501. Besides, the predetermined program is directly loaded into the memory 502 from the storage medium 508 via the reader-writer 507 or from the network via the communication device 504 and may also be executed by the CPU 501.

Figure 3:
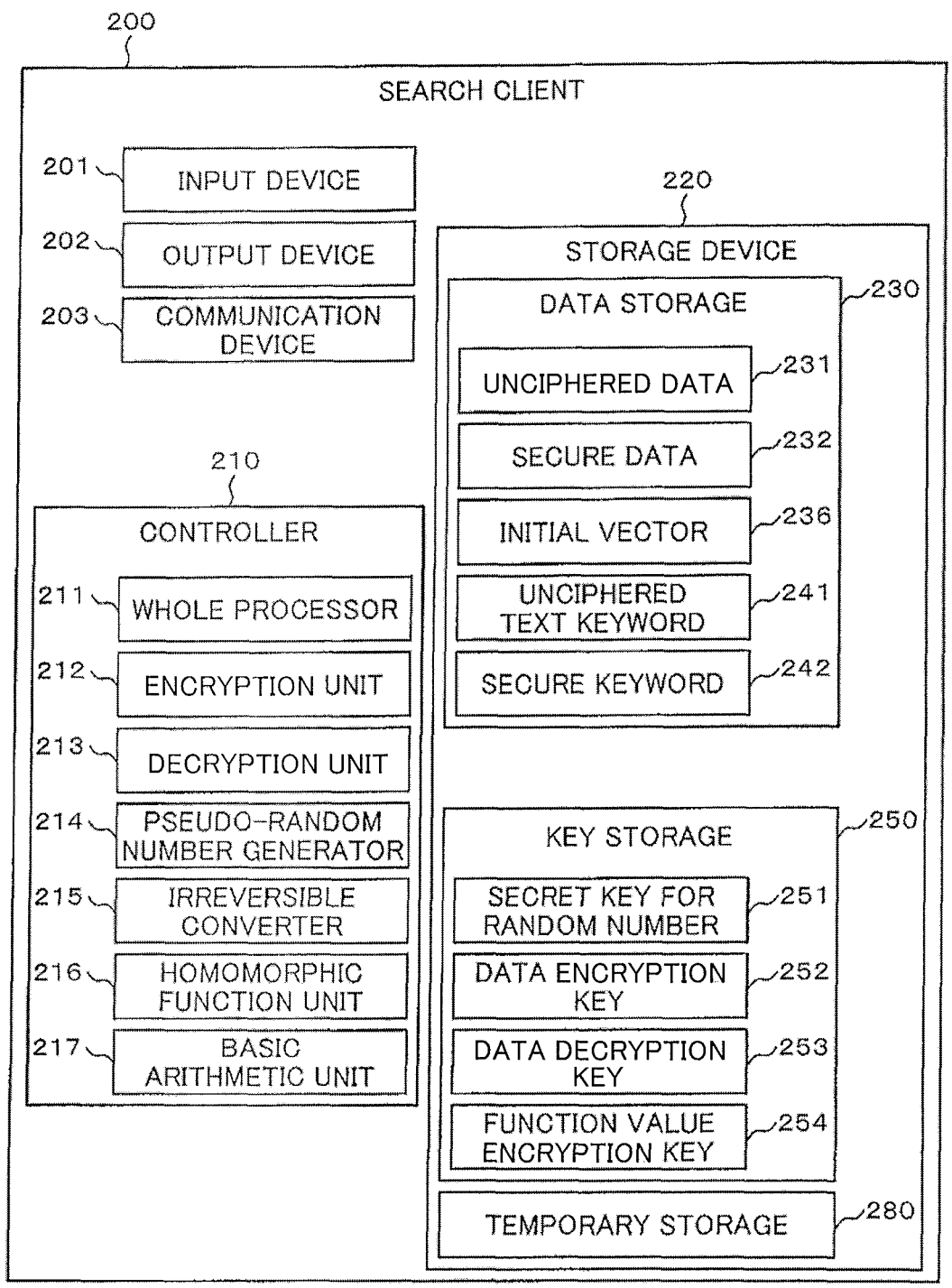
FIG. 3 shows an outline of functions of a search client.

FIG. 3 is a schematic diagram showing functions of the search client 200. As shown in FIG. 3, the search client 200 is provided with a controller 210, a storage device 220, an input device 201, an output device 202 and a communication device 203.

The storage device 220 is provided with a data storage 230, a key storage 250 and a temporary storage 280.

The data storage 230 stores information to specify a transmit sentence which is data to be transmitted to the management server 300 and information to specify data received via the communication device 203. In this embodiment, information to specify an unciphered text keyword 241 accepted by the search client 200 via the input device 201, a secure keyword 242 transmitted to the management server 300 and the unciphered text keyword 241 are stored. Besides, information to specify data received from the management server 300 via the communication device 203 is stored as secure data 232 and data acquired by removing security from the secure data 232 is stored in the data storage 230 as unciphered data 231. In addition, an initial vector 236 used for generating secure data 232 is stored.

The key storage 250 stores respective information to specify a secret key 251 for a random number (K2), a data encryption key 252 (K1), a data decryption key 253 (K1) and a function value encryption key 254 (K3) which the search client 200 is to respectively confidentially manage from a viewpoint of security. The data decryption key 253 may also be the same as the data encryption key 252 as described above and may also be different from it.

The temporary storage 280 stores information required in processing in the controller 210.

The controller 210 is provided with a whole processor 211, an encryption unit 212, a decryption unit 213, a pseudo-random number generator 214, an irreversible converter 215, a homomorphic function unit 216 and a basic arithmetic unit 217.

The whole processor 211 controls all processing in the search client 200. For example, in this embodiment, the whole processor 211 stores information the input of which the whole processor accepts via the input device 201 in the data storage 230 as the unciphered text keyword 241.

Besides, in this embodiment, the whole processor 211 instructs the output device 202 to display the unciphered text keyword 241.

In addition, in this embodiment, the whole processor 211 reads the unciphered text keyword 241 stored in the data storage 230, respectively inputs it to the encryption unit 212, the pseudo-random number generator 214, the irreversible converter 215, the homomorphic function unit 216 and the basic arithmetic unit 217, and stores respectively output data in the data storage 230 as a secure keyword 242.

Moreover, in this embodiment, the whole processor 211 transmits the secure keyword 242 to the management server 300 via the communication device 203. In addition, in this embodiment, the whole processor 211 receives secure data 232 from the management server 300 via the communication device 203.

Further, in this embodiment, the whole processor 211 stores the secure data 232 received via the communication device 203 in the data storage 230 as secure data 232. Furthermore, in this embodiment, the whole processor 211 reads the secure data 232 stored in the data storage 230, respectively inputs it to the decryption unit 213, the irreversible converter 215, the homomorphic function unit 216 and the basic arithmetic unit 217, and stores respectively output data in the data storage 230 as unciphered data 231.

Furthermore, in this embodiment, the whole processor 211 instructs the output device 202 to display the unciphered data 231. Furthermore, the whole processor 211 stores data received from the management server 300 via the communication device 203 in the temporary storage 280 and instructs the output device 202 to display the data.

The encryption unit 212 outputs data acquired by encrypting input data. For example, in this embodiment, data and the data encryption key 252 are input to the encryption unit from the whole processor 211 and the encryption unit outputs encrypted data.

The decryption unit 213 outputs data acquired by decrypting input data. For example, in this embodiment, the encrypted data and a data decryption key 253 are input from the whole processor 211 and the decryption unit decrypts the data.

The pseudo-random number generator 214 outputs a pseudo-random number. For example, the pseudo-random number generator 214 outputs a random number based upon a physical phenomenon such as temperature, time and electric energy. In this embodiment, the pseudo-random number generator 214 outputs a pseudo-random number using the secret key 251 for a random number input from the whole processor 211.

Besides, a data value of the secret key 251 for a random number is updated to a new data value and the new data value is stored in the key storage 250 by the whole processor 211 again. For example, in this embodiment, the pseudo-random number generator outputs a pseudo-random number using the secret key 251 for a random number input from the whole processor 211.

The irreversible converter 215 outputs data acquired by irreversibly converting input data. For example, in this embodiment, the irreversible converter converts data input from the whole processor 211 to different data of fixed length (h bits) and outputs it. For example, the irreversible converter 215 that converts input data of arbitrary length to data of 256 bits can be realized by installing SHA-256 which is standard cryptographic hash function algorithm.

The homomorphic function unit 216 outputs a result of the output of a homomorphic function for input data as data. However, the homomorphic function denotes a case that the mathematical expression 2 holds for the function F, the input variable x and the input variable y. When homomorphism holds with an operation code except XOR operation which is exclusive-OR every bit, this embodiment can also be similarly executed.

The basic arithmetic unit 217 executes processing related to basic arithmetic operation such as addition, subtraction, comparison operation, AND, OR and XOR.

The abovementioned search client 200 can be realized by the general computer which is shown in FIG. 5 (the schematic diagram showing the computer) for example and which is provided with the CPU 501, the memory 502, the external storage 503 such as HDD, the reader-writer 507 that reads and writes information from/to the portable storage medium 508 such as CD and DVD, the input device 506 such as a keyboard and a mouse, the output device 505 such as a display, the communication device 504 such as NIC for connecting a communication network and the internal line such as a system bus for connecting these devices.

For example, the storage device 220 can be realized when the CPU 501 utilizes the memory 502 or the external storage 503, the controller 210 and each unit included in the controller 210 can be realized by loading a predetermined program stored in the external storage 503 into the memory 502 and executing it in the CPU 501, the input device 201 can be realized when the CPU 501 utilizes the input device 506, the output device 202 can be realized when the CPU 501 utilizes the output device 505, and the communication device 203 can be realized when the CPU 501 utilizes the communication device 504.

The predetermined program is stored (downloaded) in/into the external storage 503 from the storage medium 508 via the reader-writer 507 or from the network via the communication device 504, then, is loaded into the memory 502, and may also be executed by the CPU 501. Besides, the predetermined program is directly loaded into the memory 502 from the storage medium 508 via the reader-writer 507 or from the network via the communication device 504 and may also be executed by the CPU 501.

Figure 4:
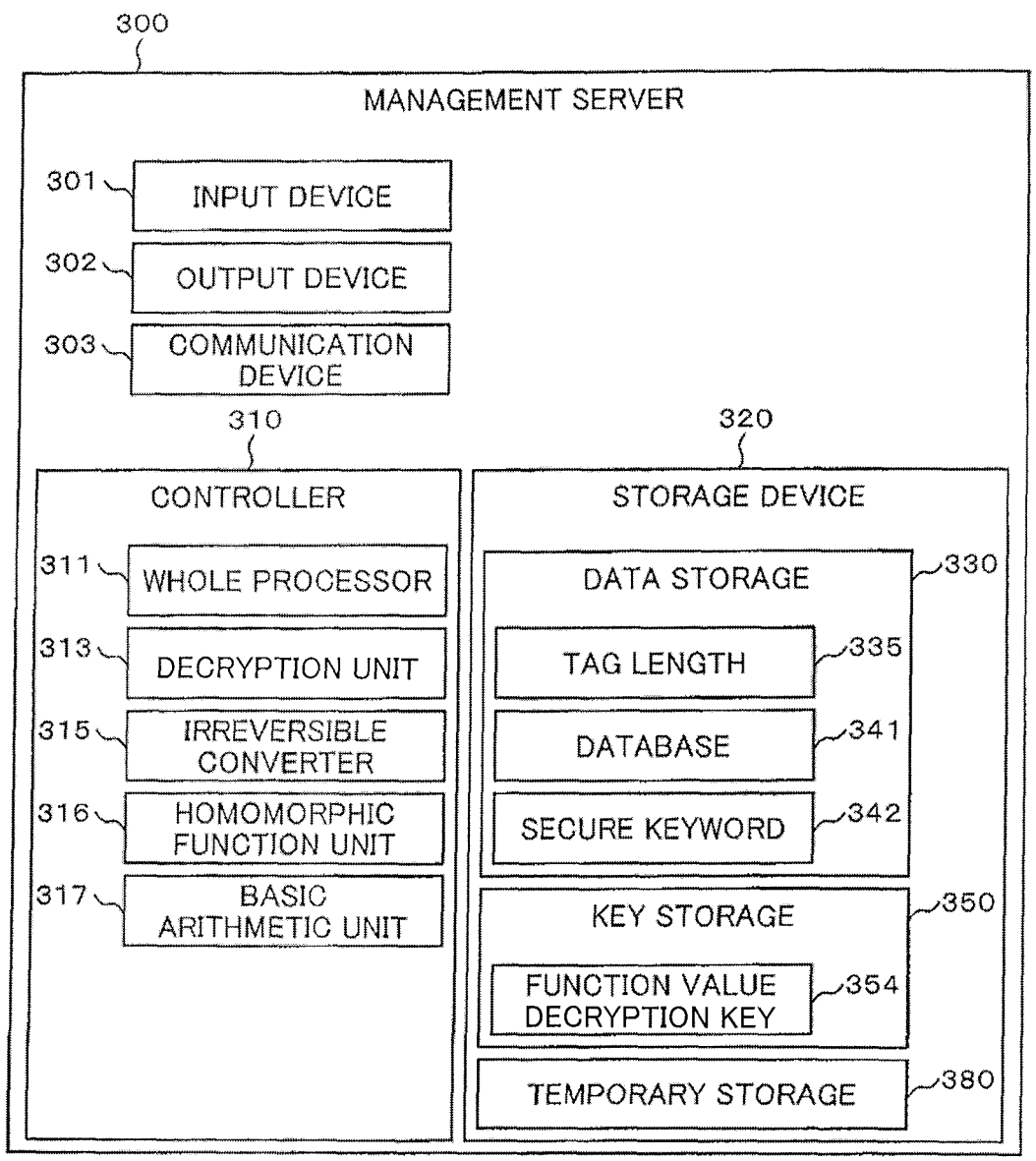
FIG. 4 shows an outline of functions of a management server.

FIG. 4 is a schematic diagram showing functions of the management server 300. As shown in FIG. 4, the management server 300 is provided with a controller 310, a storage device 320, an input device 301, an output device 302 and a communication device 303.

The storage device 320 is provided with a data storage 330 and a temporary storage 380.

The data storage 330 stores information to specify data received via the communication device 303. In this embodiment, the data storage 330 stores information received from the registration client 100 via the communication device 303 as configuration information of the database 341. Besides, the data storage 330 stores information to specify a keyword received via the communication device 303. In this embodiment, the data storage 330 stores information received from the search client 200 via the communication device 303 as a secure keyword 342. In addition, the data storage stores tag length 335 which means data length of a part of secure data.

In the temporary storage 380, information required for processing in the controller 310 is stored.

The controller 310 is provided with a whole processor 311, a decryption unit 313, an irreversible converter 315, a homomorphic function unit 316 and a basic arithmetic unit 317.

The whole processor 311 controls all processing in the management server 300. For example, in this embodiment, the whole processor 311 receives secure data 132 from the registration client 100 via the communication device 303.

In this embodiment, the whole processor 311 stores the secure data 132 received via the communication device 303 as configuration information of the data storage 330 and the database 341. Besides, in this embodiment, the whole processor 311 receives the secure keyword 342 from the search client 200 via the communication device 303. In addition, in this embodiment, the whole processor 311 stores the secure keyword 342 received via the communication device 303 in the data storage 330 as a secure keyword 342.

Moreover, in this embodiment, the whole processor 311 reads the secure keyword 342 stored in the data storage 330, respectively inputs it to the irreversible converter 315, the homomorphic function unit 316 and the basic arithmetic unit 317, and transmits respective output data to the search client 200 via the communication device 303.

Further, the whole processor 311 stores information of data received from the search client 200 or the registration client 100 via the communication device 303 in the temporary storage 380 and instructs the output device 302 to display the information.

The decryption unit 313 outputs data acquired by decrypting input data. For example, in this embodiment, data having an encrypted function value and a function value decryption key 354 are input to the decryption unit from the whole processor 311 and the decryption unit decrypts the data having the function value.

The irreversible converter 315 outputs data acquired by irreversibly converting input data. For example, in this embodiment, the irreversible converter converts the data input from the whole processor 311 to different data of fixed length (h bits) and outputs the data. For example, the irreversible converter 315 that converts input data of arbitrary length to data of 256 bits can be realized by installing an SHA-256 function which is standard cryptographic hash function algorithm.

The homomorphic function unit 316 outputs a result of the output of a homomorphic function for input data as data. However, the homomorphic function denotes a case that the mathematical expression 2 holds for the function F, the input variable x and the input variable y. When homomorphism holds with an operation code except XOR operation which is exclusive-OR every bit, this embodiment can also be similarly executed.

The basic arithmetic unit 317 executes processing related to basic arithmetic operation such as addition, subtraction, comparison operation, AND, OR and XOR.

The registration client 100, the search client 200 and the management server 300 respectively described above can be realized by the general computer which is shown in FIG. 5 (the schematic diagram showing the computer) for example and which is provided with the CPU 501, the memory 502, the external storage 503 such as HDD, the reader-writer 507 that reads and writes information from/to the portable storage medium 508 such as CD and DVD, the input device 506 such as a keyboard and a mouse, the output device 505 such as a display, the communication device 504 such as NIC for connecting to the communication network and the internal line such as a system bus for connecting these devices.

For example, the storage devices 120, 220, 320 can be realized when the CPU 501 utilizes the memory 502 or the external storage 503, the controllers 110, 210, 310 and each unit included in the controllers 110, 210, 310 can be realized by loading the predetermined program stored in the external storage 503 into the memory 502 and executing it in the CPU 501, the input devices 101, 201, 301 can be realized when the CPU 501 utilizes the input device 506, the output devices 102, 202, 302 can be realized when the CPU 501 utilizes the output device 505, and the communication devices 103, 203, 303 can be realized when the CPU 501 utilizes the communication device 504.

The predetermined program is stored (downloaded) in/into the external storage 503 from the storage medium 508 via the reader-writer 507 or from the network via the communication device 504, then, is loaded into the memory 502, and may also be executed by the CPU 501. Besides, the predetermined program is directly loaded into the memory 502 from the storage medium 508 via the reader-writer 507 or from the network via the communication device 504 and may also be executed by the CPU 501.

<Flow for Registering Secure Data>

Figure 12:
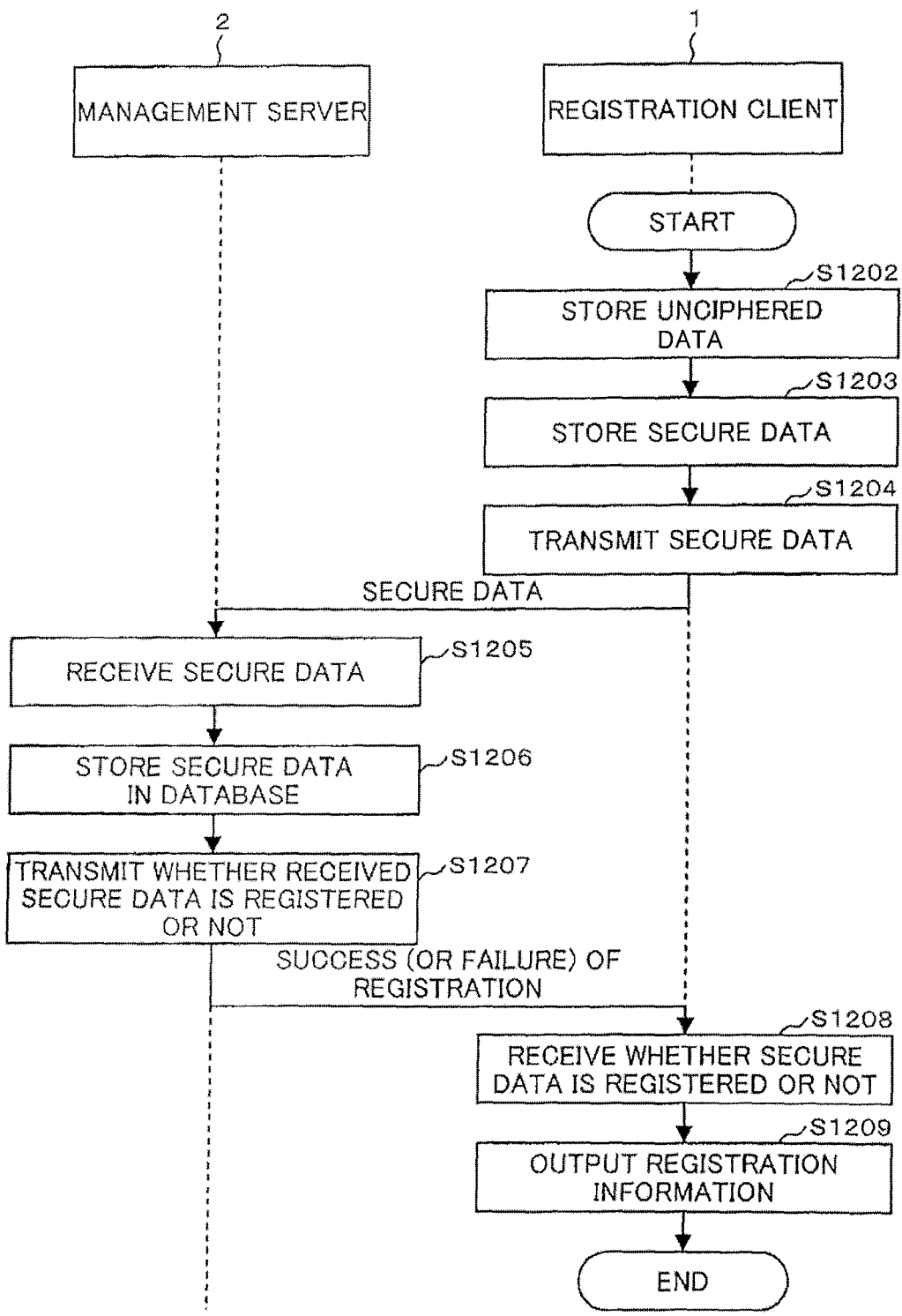
FIG. 12 is a flowchart showing a procedure for registering the secure data in the management server and the registration client.

FIG. 12 is a sequence diagram showing a process in which the registration client 100 registers secure data 132 in the management server 300 via the network 400 in this embodiment. A sequence 1 is a step which the registration client 100 executes and a sequence 2 is a step which the management server 300 executes in synchronization with the sequence 1.

The registration client 100 stores information input from a user via the input device 101 in the storage device 120 as unciphered data 131 (S1202). The controller 110 of the registration client 100 creates its secure data 132 and stores it in the storage device 120 (S1203). The registration client 100 transmits the secure data 132 to the management server 300 via the network 400 from the communication device 103 (S1204).

The management server 300 receives the secure data 132 transmitted by the registration client 100 from the communication device 303 via the network 400 (S1205). The controller 310 of the management server 300 stores the received secure data 132 in the storage device 320 as configuration information of the database 341 (S1206). The management server 300 transmits whether the secure data 132 is registered or not to the registration client via the network 400 from the communication device 303 (S1207).

The registration client 100 receives whether the secure data 132 is registered or not transmitted by the is management server 300 from the communication device 103 via the network 400 (S1208). The registration client 100 instructs the output device 102 to display registration information including whether the secure data is registered or not for the user (S1209).

The abovementioned procedure is not necessarily required to be all processed. For example, the step S1203 may also be omitted.

<Flow for Searching Secure Data>

Figure 13:
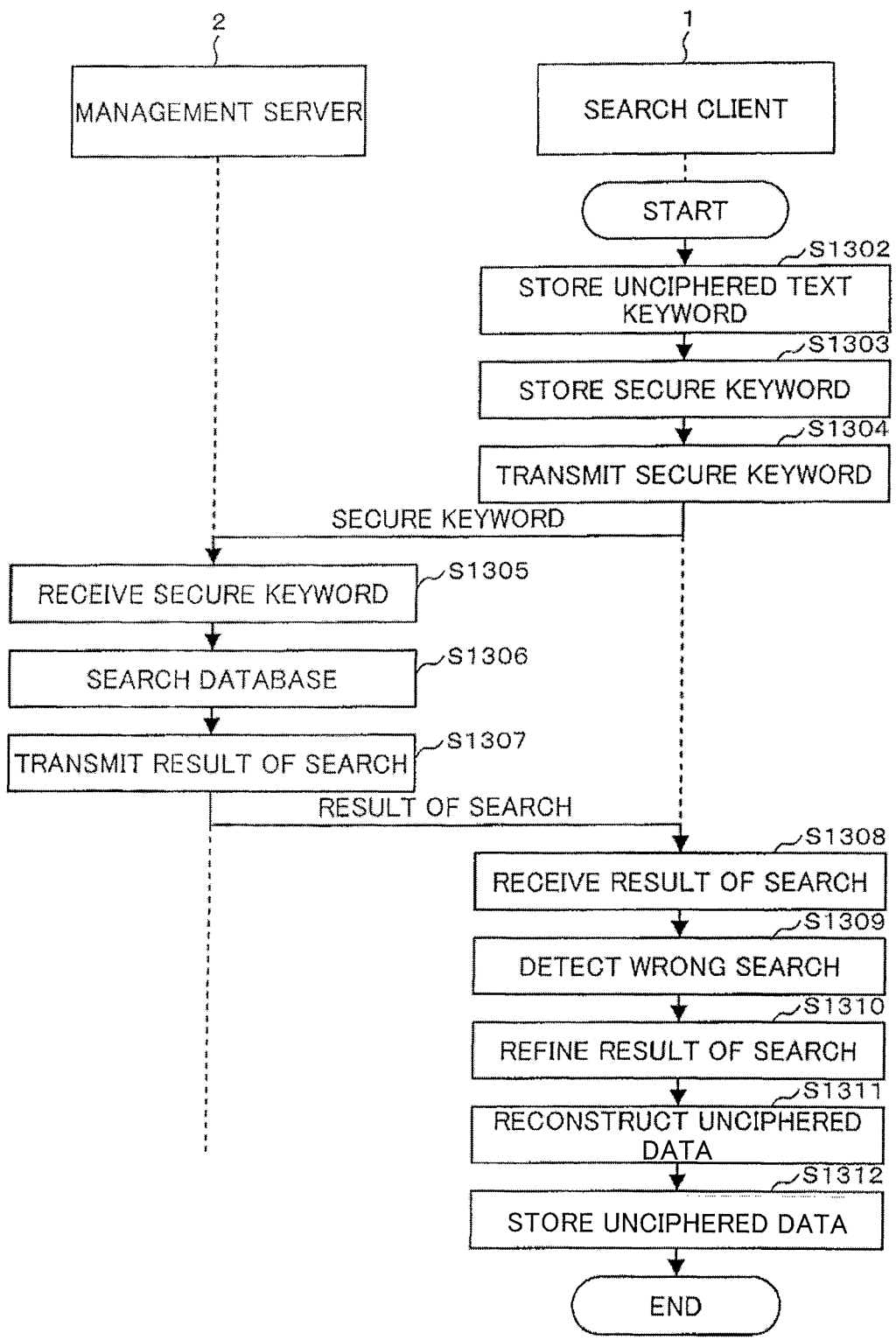
FIG. 13 is a flowchart showing a procedure for searching the secure data in the management server and the search client.

FIG. 13 is a sequence diagram showing a process in which the management server 300 searches the database 341 using a secure keyword 242 transmitted via the network 400 by the search client 200 in this embodiment. A sequence 1 is a step which the search client 200 executes and a sequence 2 is a step which the management server 300 executes in synchronization with the sequence 1.

The search client 200 stores information input from the user via the input device 201 in the storage device 220 as an unciphered text keyword 241 (S1302). The controller 210 of the search client 200 creates a secure keyword 242 and stores it in the storage device 220 (S1303). The search client 200 transmits the secure keyword 242 to the management server 300 via the network 400 from the communication device 203 (S1304).

The management server 300 receives the secure keyword 242 transmitted by the search client 200 from the communication device 303 via the network 400 (S1305). The controller 310 of the management server 300 searches the secure data related to the secure keyword 342 from the database 341 (S1306). The management server 300 transmits a result of the search corresponding to the secure keyword 342 (there are a case that the secure data is included and a case that no secure data is included) to the search client via the network 400 from the communication device 303 (S1307).

The search client 200 receives the result of the search corresponding to the secure keyword 242 transmitted by the management server 300 from the communication device 203 via the network 400 (S1308).

When the secure data is included in the result of the search, the controller 210 of the search client 200 detects whether a wrong search is included in the result of the search or not (S1309). The controller removes the secure data judged as the wrong search and data related to it from the result of the search (S1310).

When the secure data is included in the result of the search, the controller 210 of the search client 200 restores the unciphered data 231 based upon the result of the search corresponding to the secure keyword 242 (S1311). The search client 200 stores the unciphered data 231 extracted via the output device 202 in the storage device 220. Besides, the search client may also instruct the output device 202 to display the extracted unciphered data 231 (S1312).

The abovementioned procedure is not necessarily required to be all processed. For example, the steps S1309 and S1310 may also be omitted.

<Method of Generating Secure Data>

A procedure for a method of generating secure data 132 in the registration client 100 will be described referring to FIGS. 6 and 7 below.

The whole processor 111 of the registration client 100 acquires the secret key 151 for a random number and the data encryption key 152 from the key storage 150, the initial vector 136 and the tag length 135 from the data storage 130. The whole processor 111 of the registration client 100 secures a working area required for generating secure data 132 in the temporary storage 180.

The whole processor 111 of the registration client 100 acquires unciphered data 131 and divides it into size in which the encryption unit 112 can process. For example, when a common key cryptosystem AES is installed in the encryption unit 112, the unciphered data M is divided into M1, M2, - - -, Mn in blocks of 128 bits as shown in FIG. 6B.

The whole processor 111 of the registration client 100 inputs the initial vector 136, the data encryption key 152 and the divided "n" pieces of unciphered data 131 to the encryption unit 112 and acquires output n pieces of intermediate encrypted data C1, C2, - - -, Cn. In the encryption of the unciphered data 131, the next intermediate encrypted data is created utilizing the intermediate encrypted data created before. For example, as shown in FIG. 6B, data acquired by calculating the former exclusive-OR (xor operation) of the intermediate encrypted data and the unciphered data 131 is encrypted and the next intermediate encrypted data is created. Accordingly, contents of the other blocks M1, M2, - - -, Mn-1 in unciphered text are reflected in the intermediate encrypted data Cn corresponding to the block Mn.

The whole processor 111 of the registration client 100 inputs the initial vector 136 and the secret key for a random number to the pseudo-random number generator 114 and generates random numbers used for n pieces of intermediate encrypted data. For example, as shown in FIG. 6A, data in which the initial vector 136 and a constant are connected is input to the pseudo-random number generator (RNG) 114 together with the secret key for a random number K2 and n random numbers R1, R2, - - - , Rn per 128 bits are generated.

The whole processor 111 of the registration client 100 inputs the n"th" random number Rn to the homomorphic function unit 116 and acquires output data as a function value X. For example, as shown in FIG. 7, the random number of 128 bits is input to the homomorphic function unit 116 and a function value of 96 bits is acquired.

The whole processor 111 of the registration client 100 inputs the function value X to the irreversible converter 115 and acquires output data as an irreversible converted value H. For example, when hash function SHA256 is installed in the irreversible converter 115, the function value of 96 bits is converted to a hash value of 256 bits (an irreversible converted value). For example, as shown in FIG. 7, the whole processor 111 extracts the least significant 32 bits of the hash value of 256 bits and acquires a search tag for the secure data Dn+1. As a result, data for a search the data size of which is smaller than the original data is acquired.

FIG. 14 shows a format of ciphertext generated in the abovementioned processing. The ciphertext is configured by Nonce of 8 bits which is a header, a main body of the ciphertext acquired by encrypting each block that configures its unciphered text by a random number and a search tag which is a hash value of a homomorphic function value of the random number.

The whole processor 111 of the registration client 100 acquires a bit length recorded in a field of the tag length 135 as the search tag for the secure data Dn+1 from the irreversible converted value H. For example, as shown in FIG. 7, the whole processor extracts the least significant 32 bits of the hash value of 256 bits and acquires collating data D'n+1. Bits to be extracted from the irreversible converted value H are not necessarily required to be the least significant bits, and they may also be extracted from the most significant bits. Fixed bits may also be extracted or each bit may also be extracted at random. Besides, the bit length may also be arbitrarily selected.

The whole processor 111 of the registration client 100 inputs the n pieces of intermediate encrypted data and random numbers to the basic arithmetic unit 117, the basic arithmetic unit 117 calculates respective exclusive-OR (the XOR operation) as shown in the following mathematical expression 3, and output results D1, D2, - - - , Dn are acquired as the main body of the ciphertext.

$$Di = Ci \text{ xor } Ri (i=1, \text{ - - - }, n) \quad \text{(Mathematical expression 3)}$$

The whole processor 111 of the registration client 100 connects the initial vector 136, the main body of the ciphertext D1, D2, - - - , Dn and the search tag Dn+1 and stores it in the data storage 130 as secure data 132.

The size of the secure data can be reduced by extracting the search tag Dn+1 for secure data from the irreversible converted value H and generating the secure data in the generation of the secure data as described above. For example, when secure data is generated from unciphered text of 128 bits according to FIG. 7, 128 bits of the main body of the ciphertext and 32 bits of the secure data are added to the size of the initial vector (shall be tentatively 32 bits) to be approximately 192 bits.

In the meantime, when the size of the search tag for secure data is reduced, information volume in the search tag is not sufficient and side reaction that the probability of the occurrence of wrong searches in the management server increases also occurs. In this embodiment, means for detecting a wrong search for inhibiting the side reaction will be described referring to FIG. 10 later.

The abovementioned procedure for generating the secure data is not necessarily required to be processed in the order described above and may also be executed in a different order.

<Method of Generating Secure Keyword>

A procedure for generating a secure keyword 242 in the search client 200 will be described referring to FIG. 8 below.

The whole processor 211 of the search client 200 acquires the secret key 251 for a random number, the data encryption key 252 and the function value encryption key 254 from the key storage 250 and acquires the initial vector 236 from the data storage 230. The whole processor 211 of the search client 200 secures a working area required for the generation of the secure keyword 242 in the temporary storage 280.

The whole processor 211 of the search client 200 acquires an unciphered text keyword 241 and the encryption unit 212 divides it in processible size. For example, as in the encryption of the unciphered data 131 in FIG. 6B, the unciphered text keyword M is divided into M1, M2, - - - , Mn per 128 bits.

The whole processor 211 of the search client 200 inputs the initial vector 236, the data encryption key 252 and the divided pieces of the unciphered text keyword 241 to the encryption unit 212 and acquires output n intermediate encrypted keywords C1, C2, - - - , Cn.

In the encryption of the unciphered text keyword 241, as in the encryption of the unciphered data 131, the next intermediate encrypted keyword is created utilizing the previously created intermediate encrypted keyword. For example, as shown in FIG. 6B, data acquired by the xor operation of the previous intermediate encrypted keyword and the unciphered text keyword 241 is encrypted and the next intermediate encrypted keyword is created.

The whole processor 211 of the search client 200 inputs the initial vector (W0) 236 and the secret key for a random number (K2) 251 to the pseudo-random number generator 214 and the pseudo-random number generator generates one random number R'n used for the xor operation of it and the n"th" intermediate encrypted keyword Cn.

The whole processor 211 of the search client 200 inputs the random number R'n to the homomorphic function unit 216 and acquires output data as a function value X. For example, as shown in FIG. 8, the whole processor inputs the random number R'n of 128 bits to the homomorphic function unit 216 and acquires a function value X of 96 bits.

The whole processor 211 of the search client 200 inputs the function value encryption key (K3) 254 and the function value X to the encryption unit 212 and acquires output data as a search tag for a secure keyword Wn+1. For example, as shown in FIG. 8, the encryption unit 212 outputs ciphertext of 128 bits based upon the function value X of 96 bits using the data encryption key (K1) 252 and the initial vector (W0) 236 and the search tag for a secure keyword Wn+1 is acquired.

The whole processor 211 of the search client 200 inputs the n"th" intermediate encrypted keyword Cn and the random number R'n to the basic arithmetic unit 217, the basic arithmetic unit 217 calculates their exclusive-OR (XOR operation), and the whole processor acquires an output result Wn as a main body of an encrypted keyword.

The whole processor 211 of the search client 200 connects the initial vector W0, the main body Wn of the encrypted keyword and the search tag for a secure keyword Wn+1 and stores this in the data storage 230 as a secure keyword 242.

The whole processor uses data acquired by the exclusive-OR (the XOR operation) of the n"th" intermediate encrypted keyword Cn and the random number R'n for the main body Wn of the encrypted keyword as shown in the following mathematical expression 4.

$$Wn = Cn \text{ xor } R'n \qquad \text{(Mathematical expression 4)}$$

Data acquired by connecting a search tag for a secure keyword to the search tag for a secure keyword Wn+1 and the main body Wn of the encrypted keyword is used for a secure keyword 242.

Even if there are n blocks of the encrypted keyword in the generation of the secure keyword as described above, the secure keyword can be inhibited in size of the ciphertext for two blocks. For example, when a secure keyword is created from unciphered text of 12800 (n=100) bits according to FIG. 7, the secure keyword can be reduced to approximately 256 bits (for two groups of 128 bits).

A procedure for creating the secure keyword is not necessarily required to be processed in order described above and may also be executed in different order.

<Method of Searching Secure Data>

Figure 9:
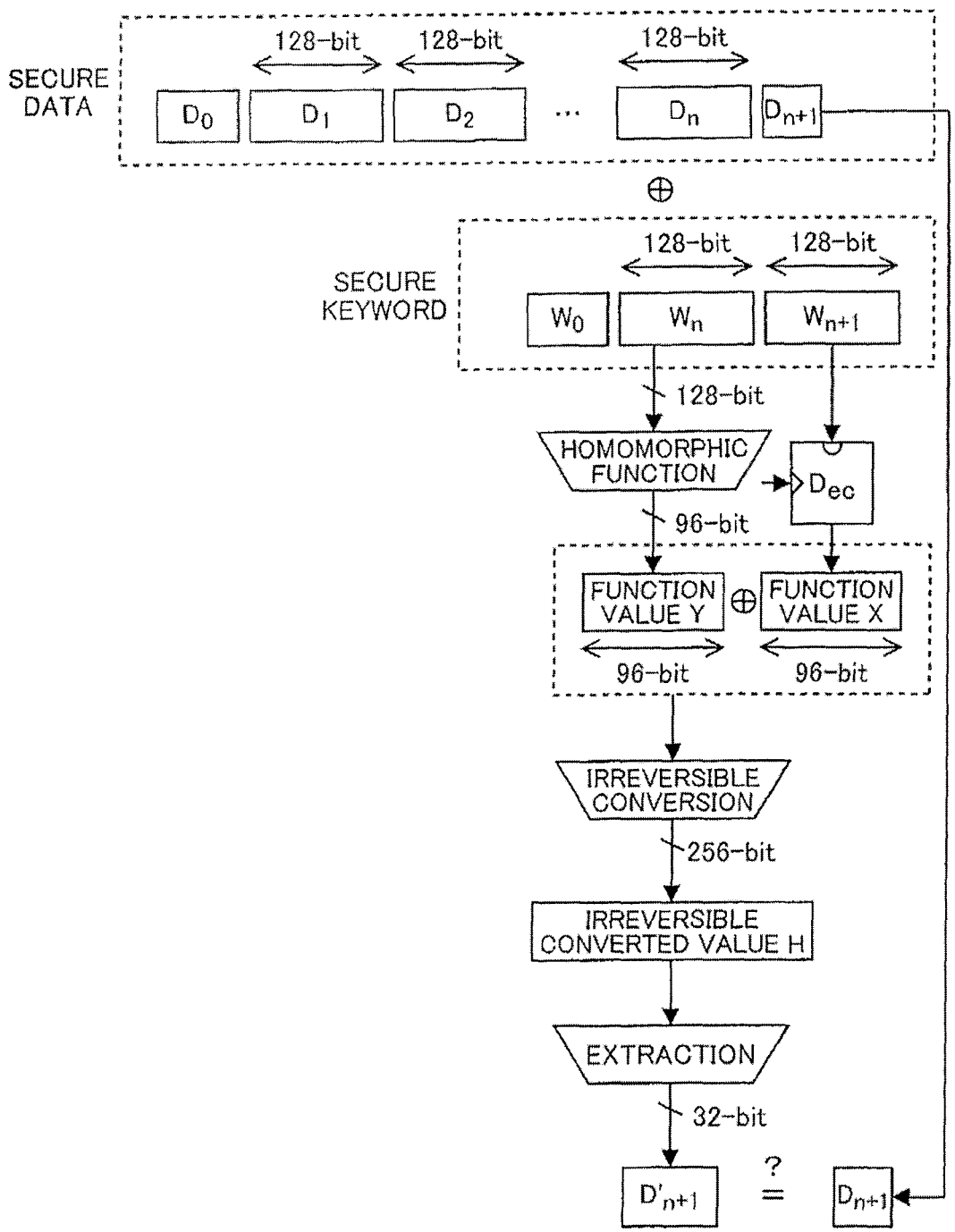
FIG. 9 is a block diagram showing a procedure for searching the secure data in the management server.

A procedure for a method of searching secure data in the management server 300 will be described referring to FIG. 9 below. Concretely, a procedure for detecting whether the unciphered data and the unciphered text keyword 241 are the same or not in the management server 300 using the secure data and the secure keyword 342 will be described.

The whole processor 311 of the management server 300 acquires a function value decryption key 354 from a key storage 350, the secure keyword 342 and the tag length 335 from the data storage 330 and the secure data stored in the database 341. The whole processor 311 of the management server 300 secures a working area required for a search for the secure data in the temporary storage 380.

The whole processor 311 of the management server 300 acquires a main body of ciphertext in the secure data and extracts the n"th" block of the blocks divided in the size processed by the encryption unit 112. For example, the secure data D is regarded as a set of blocks divided into D0, D1, D2, - - -, Dn, Dn+1, and the data Dn is extracted.

The whole processor 311 of the management server 300 acquires the main body of the encrypted keyword in the secure keyword 342. For example, the secure keyword W is regarded as a set of blocks divided into W0, Wn, Wn+1 in 3, and the second data Wn is extracted.

The whole processor 311 of the management server 300 inputs the main body Dn of the ciphertext and the encrypted keyword Wn to the basic arithmetic unit 317, the basic arithmetic unit 317 calculates their exclusive-OR (XOR operation), and the whole processor 311 acquires an output result according to a mathematical expression 5.

$$Dn \text{ xor } Wn = (Cn \text{ xor } Rn)\text{xor}(Cn \text{ xor } R'n) \text{(Mathematical expression 5)}$$

In this case, since a value of intermediate encrypted data and a value of intermediate ciphertext respectively acquired by encrypting them are equal when a value of the unciphered data and a value of the unciphered text keyword are the same, the following mathematical expression 6 can be led. (Based upon $\neg(A \text{ xor } B) = A \cdot B + \neg A \cdot \neg B$, however, "$\neg$" denotes negation or a complement)

$$Dn \text{ xor } Wn = Rn \text{ xor } R'n \qquad \text{(Mathematical expression 6)}$$

That is, only the information of the random numbers (Rn and R'n) is left in the mathematical expression 6.

The whole processor 311 of the management server 300 inputs the output result from the basic arithmetic unit 317 to the homomorphic function unit 316 and acquires a function value Y which is an output result of the homomorphic function unit 316. For example, as shown in FIG. 9, the exclusive-OR (XOR) of the n"th" block Dn of 128 bits in the main body of encrypted data and the main body of the secure keyword of 128 bits is operated, the value is input to the homomorphic function unit 316, and as shown in the following mathematical expression 7, the function value Y of 96 bits for example is acquired.

$$Y = F(Dn \text{ xor } Wn) \qquad \text{(Mathematical expression 7)}$$

When the mathematical expression 6 holds, the following mathematical expression 8 can be led from the mathematical expression 7.

$$Y = F(Rn \text{ xor } R'n) \qquad \text{(Mathematical expression 8)}$$

The whole processor 311 of the management server 300 acquires a search tag for a secure keyword in the secure keyword 342. For example, the secure keyword W is regarded as a set of the blocks divided into W0, Wn, Wn+1 in three and the third data Wn+1 is extracted.

The whole processor 311 of the management server 300 inputs the function value decryption key (K3) 354 and the search tag Wn+1 for a secure keyword to the decryption unit 313 and acquires a decrypted function value X. The function value X is expressed in the following mathematical expression 9 using the random number Rn and a homomorphic function F in the mathematical expression 2.

$$X = F(Rn) \qquad \text{(Mathematical expression 9)}$$

The whole processor 311 of the management server 300 inputs the function value X and the function value Y to the basic arithmetic unit 317, the basic arithmetic unit 317 calculates their exclusive-OR (XOR operation), and the whole processor acquires an output function value Z. The following mathematical expression 10 holds for the function value Z.

(Original data (B) is acquired when the operation of exclusive-OR depending upon different data (A) is applied to the data (B) twice based upon "A xor(A xor B)=A·$\neg$(A xor B)+$\neg$A·(A xor B)=A·B+$\neg$A·B=B")

(Mathematical expression 10)

$$\begin{aligned}
Z &= X \text{ xor } Y \\
&= F(Rn) \text{ xor } (F(Rn \text{ xor } R'n)) \\
&= F(Rn) \text{ xor } (F(Rn) \text{ xor } F(R'n)) \\
&\quad \text{(from mathematical expression 2)} \\
&= F(R'n)
\end{aligned}$$

The whole processor 311 of the management server 300 inputs the function value Z to the irreversible converter 315 and acquires output data as an irreversible converted value H. For example, as shown in FIG. 9, when the hash function SHA256 is installed in the irreversible converter 315, a value of the exclusive-OR of the function value X and the function value Y of respectively 96 bits is converted to a hash value of 256 bits (an irreversible converted value).

The whole processor 311 of the management server 300 acquires bit length recorded in the tag length 335 from the irreversible converted value H as collating data S. For example, as shown in FIG. 9, the whole processor extracts the least significant 32 bits of the hash value of 256 bits and acquires collating data D'n+1. Bits to be extracted from the irreversible converted value H are not limited to the least significant bits, and they may also be the most significant bits. Fixed bits may also be extracted or each bit may also be extracted at random. Besides, bit length may also be arbitrarily selected.

The whole processor 311 of the management server 300 acquires a search tag for secure data in the secure data. For example, the whole processor extracts data Dn+1 in the secure data D.

The whole processor 311 of the management server 300 inputs collating data D and the search tag for secure data to the basic arithmetic unit 317, the basic arithmetic unit 317 compares them, when they are the same, TRUE (=1) is output, and when they are not the same, FALSE (=0) is output.

Finally, the search tag for the secure data Dn+1 and the collating data D'n+1 are compared. When they are the same, it is judged that a search should be made, and when they are different, it is judged that a search is not required to be made.

A procedure for searching the secure data is not necessarily required to be executed in the order described above and may also be executed in a different order.

<Method of Detecting Wrong Search of Secure Data>

Depending upon the size of a search tag, an error may be included in a result of a search. For example, since irreversible converted values conflict at the probability of 1/256 in a case that a search tag for secure data is 8 bits when data output by the irreversible converter 115 evenly distributes, it is wrongly judged that values of unciphered data and an unciphered text keyword are the same even if the values of the unciphered data and the unciphered text keyword are different. That is, a wrong search result (values of the unciphered data and the unciphered text keyword are different) is included in addition to correct search results (the values of the unciphered data and the unciphered text keyword are equal). Similarly, when a search tag is changed from 8 bits to 16 bits, the probability of a wrong search is reduced to 1/65536. When the irreversible converted value itself (for example, 256 bits) is utilized for a search tag for secure data, probability that a wrong search occurs is asymptotically approximately zero (0) (not truly zero), although secure data is enlarged and presses the storage of the management server. Then, a procedure for detecting a wrong search in the search client will be described below.

The procedure for processing wrong detection of secure data 232 in the search client 200 will be described referring to FIG. 10 below. Concretely, the procedure in which the search client 200 detects whether the unciphered data and the unciphered text keyword 241 are the same or not using the secure data 232 and the secure keyword 242 will be described below.

The whole processor 211 of the search client 200 acquires the secret key for a random number (K2) 251 from the key storage 250, the initial vector (D0) 236 from the data storage 230 and the intermediate encrypted keywords (C1 to Cn) from the temporary storage 280.

The whole processor 211 of the search client 200 secures a working area required for the wrong detection of the secure data 232 in the temporary storage 280.

The whole processor 211 of the search client 200 acquires the initial vector 236 in the secure data 232. For example, the whole processor regards the secure data D as a set of blocks divided into D0, D1, D2, - - - , Dn, Dn+1 and extracts an initial vector D0.

The whole processor 211 of the search client 200 inputs the initial vector 236 and the secret key for a random number 251 to the pseudo-random number generator 214 and generates a random number used for a main body of ciphertext. For example, as shown in FIG. 6A, the whole processor inputs data acquired by connecting the initial vector 236 and a constant to the pseudo-random number generator 214 together with the secret key for a random number (K2) 251 and generates n random numbers R1, R2, - - - , Rn per 128 bits.

FIG. 15 shows an outline of a process for detecting a wrong search below.

The whole processor 211 of the search client 200 inputs a main body of ciphertext and a random number to the basic arithmetic unit 217, the basic arithmetic unit 217 calculates their exclusive-OR (XOR operation), and the whole processor acquires output results C'1, C'2, - - - , C'n as intermediate encrypted data. Relation shown in the following mathematical expression 11 is established among C'i, Di and Ri.

$$C'i = Di \text{ xor } Ri (i=1, ---, n) \quad \text{(Mathematical expression 11)}$$

When values of the unciphered data and the unciphered text keyword are equal, values of their intermediate ciphertext and intermediate encrypted keyword are equal.

Then, since Di=Ci xor Ri and C'i=Di xor Ri=(Ci xor Ri)xor Ri=Ci from the mathematical expressions 3 and 11, the values of the unciphered data and the unciphered text keyword can be regarded as equal if C'i=Ci. The search client 200 verifies this.

The whole processor 211 of the search client 200 inputs the intermediate encrypted data and the intermediate encrypted keyword to the basic arithmetic unit 217 and the basic arithmetic unit 217 determines whether they are equal or not. The basic arithmetic unit 217 outputs TRUE (=1) if they are the same (C'i=Ci) and outputs FALSE (=0) if they are different. The whole processor judges that a wrong search occurs when the whole processor receives FALSE.

The abovementioned procedure for detecting the wrong search is not necessarily required to be executed in the order described above and may also be executed in a different order.

As described above, in the search in this embodiment, it is determined depending upon whether the search tags generated based upon random numbers used for encryption are coincident or not whether unciphered text and ciphertext corresponding to the unciphered text are coincident or not. The random numbers used when the unciphered text is encrypted and intermediate cipher is generated are a quantity that characterizes the coincidence of the unciphered text in the search executed in an encrypted state in this embodiment. That is, the search tag generated based upon the random number does not directly reflect the unciphered text, although the search tag is a quantity corresponding to the unciphered text.

Besides, as described above, in the search using the search tag in this embodiment, a primary search is executed on the side of the server at the precision of ½$^n$ (precision (relevance factor of search result)<1) using a search tag of n bits, and a secondary search in which data is decrypted and compared (comparable at intermediate cipher level) is executed on the sides of the clients (finally, precision should be 1).

<Method of Decrypting Secure Data>

A procedure for decrypting secure data 232 in the search client 200 will be described referring to FIG. 11 below.

The whole processor 211 of the search client 200 acquires the secret key 251 for a random number and the data decryption key 253 from the key storage 250 and the initial vector 236 from the data storage 230. The whole processor 211 of the search client 200 secures a working area required for decrypting the secure data 232 in the temporary storage 280.

The whole processor 211 of the search client 200 acquires the initial vector 236 in the secure data 232. For example, the whole processor regards the secure data D as a set of blocks divided into D0, D1, D2, - - -, Dn, Dn+1 and extracts the initial vector D0.

The whole processor 211 of the search client 200 inputs the initial vector 236 and the secret key 251 for a random number to the pseudo-random number generator 214 and generates n random numbers used for a main body of ciphertext. For example, as shown in FIG. 6A, the whole processor 211 inputs data acquired by connecting the initial vector 236 and a constant to the pseudo-random number generator 214 together with the secret key 251 for a random number and generates n random numbers R1, R2, - - -, Rn every 128 bits.

The whole processor 211 of the search client 200 inputs the main body of the ciphertext and the random numbers to the basic arithmetic unit 217, the basic arithmetic unit 217 calculates their exclusive-OR (XOR operation), and the whole processor acquires output results C'1, C'2, - - -, C'n as intermediate encrypted data.

The whole processor 211 of the search client 200 inputs the initial vector 236, the data decryption key 253 and the n pieces of intermediate encrypted data to the decryption unit and acquires output n pieces of unciphered data M1, M2, - - -, Mn. In the decrypting of the intermediate encrypted data, data acquired by the xor operation of the previous intermediate encrypted data and unciphered data is stored in the data storage 230 as the unciphered data 231 as shown in FIG. 11 for example.

The procedure for decrypting the secure data is not necessarily required to be executed in the order described above and may also be executed in a different order.

What is claimed is:

1. A searchable code processing system in which a registration client, a search client and a management server are connected via a network,
wherein the registration client is provided with units that create secure data acquired by encrypting unciphered data for registration;
wherein the management server is provided with a storage that stores secure data including a search tag used for a search;
wherein the registration client further determines the length of the search tag for the secure data according to tag length stored in a data storage and is provided with units that create the search tag for the secure data and compress a size of the search tag using a stochastic encryption system using a mask by a hash value and an output value of a homomorphic function;
wherein the homomorphic function ("F") meets mathematical expression, $$F(x*y)=F(x)?F(y),$$

wherein "x" is an input variable and "y" is another input variable, and wherein "*" and "?" denote an operation code, including an operation code for addition ("+"), an operation code for multiplication ("*"), or an operation code for operating XOR (eXclusive OR) which is exclusive-OR every bit ("xor");
wherein the search client creates and compresses a secure keyword acquired by encrypting an unciphered text keyword for a search using stochastic encryption and transmits the secure keyword to the management server via the network;
wherein the management server receives the secure keyword via the network and searches the secure data and the secure keyword;
wherein the search client creates the secure keyword by encrypting the unciphered text keyword for a search and makes data acquired by masking a part of the secure keyword by a random number included in the secure keyword using the mask by the hash value and the output value of the homomorphic function;
wherein the management server searches the secure data and the secure keyword, makes the secure data included in a part of a result of the search, and transmits the result of the search to the search client via the network, without having the management server release a mask by random numbers of the secure data and the secure keyword;
wherein the search client receives the result of the search transmitted via the network;
wherein the registration client generates a random number using an initial vector;
wherein the secure data includes the initial vector;
wherein the registration client creates intermediate encrypted data acquired by encrypting unciphered data;
wherein the registration client creates a main body of ciphertext acquired by masking the intermediate encrypted data using the random number and using the mask by the hash value and the output value of the homomorphic function;
wherein the secure data includes the main body of the ciphertext; and
wherein the registration client creates the main body of ciphertext by encrypting each block that configures unciphered text of said each block by the random number and the search tag which is a hash value of a homomorphic function value of the random number ($H(F(r_i))$).

2. The searchable code processing system according to claim 1, wherein the search client generates the same random number as the random number generated by the registration client using the initial vector embedded in the secure data.

3. The searchable code processing system according to claim 2, wherein the search client generates the random number generated by the registration client using the initial vector embedded in the secure data; and
wherein a mask of the random number that masks the main body of the ciphertext using the mask by the hash value and the output value of the homomorphic function is released.

4. The searchable code processing system according to claim 2, wherein the search client compares the main body of the ciphertext from which the mask of the random number is released and the secure keyword.

5. The searchable code processing system according to claim 1, wherein the registration client creates the search tag having a different length from the tag length stored in the data storage for the secure data.

6. A searchable code processing method in a system in which a registration client, a search client and a management server are connected via a network,
wherein the registration client creates secure data acquired by encrypting unciphered data for registration;

wherein the management server stores secure data including a search tag used for a search;
wherein the registration client further determines the length of the search tag for the secure data according to tag length stored in a data storage and creates the search tag for the secure data and compresses a size of the search tag using a stochastic encryption system using a mask by a hash value and an output value of a homomorphic function;
wherein the homomorphic function ("F") meets mathematical expression, $$F(x*y)=F(x)?F(y),$$

wherein "x" is an input variable and "y" is another input variable, and
wherein "*" and "?" denote an operation code, including an operation code for addition ("+"), an operation code for multiplication ("*"), or an operation code for operating XOR (eXclusive OR) which is exclusive-OR every bit ("xor");
wherein the search client creates and compresses a secure keyword acquired by encrypting an unciphered text keyword for a search using stochastic encryption and transmits the secure keyword to the management server via the network;
wherein the management server receives the secure keyword via the network and searches the secure data and the secure keyword;
wherein the search client creates the secure keyword by encrypting the unciphered text keyword for a search and makes data acquired by masking a part of the secure keyword by a random number included in the secure keyword using the mask by the hash value and the output value of the homomorphic function;
wherein the management server searches the secure data and the secure keyword, makes the secure data included in a part of a result of the search, and transmits the result of the search to the search client via the network, without having the management server release a mask by random numbers of the secure data and the secure keyword;
wherein the search client receives the result of the search transmitted via the network;
wherein the registration client generates a random number using an initial vector;
wherein the secure data includes the initial vector;
wherein the registration client creates intermediate encrypted data acquired by encrypting unciphered data;
wherein the registration client creates a main body of ciphertext acquired by masking the intermediate encrypted data using the random number and using the mask by the hash value and the output value of the homomorphic function;
wherein the secure data includes the main body of the ciphertext; and
wherein the registration client creates the main body of ciphertext by encrypting each block that configures unciphered text of said each block by the random number and the search tag which is a hash value of a homomorphic function value of the random number ($H(F(r_i))$).

7. The searchable code processing method according to claim 6, wherein the search client generates the same random number as the random number generated by the registration client using the initial vector embedded in the secure data.

8. The searchable code processing method according to claim 7, wherein the search client compares the main body of the ciphertext from which a mask of the random number is released and the secure keyword.

9. A non-transitory computer readable storage medium in which a program for executing a searchable code processing method by a registration client connected to a search client and a management server via a network is stored, wherein the method includes:
creating secure data acquired by encrypting unciphered data for registration;
storing secure data including a search tag used for a search in the management server;
determining the length of the search tag for the secure data according to tag length stored in a data storage, and creating the search tag for the secure data and compressing a size of the search tag using a stochastic encryption system using a mask by a hash value and an output value of a homomorphic function;
wherein the homomorphic function ("F") meets mathematical expression, $$F(x*y)=F(x)?F(y),$$

wherein "x" is an input variable and "y" is another input variable, and
wherein "*" and "?" denote an operation code, including an operation code for addition ("+"), an operation code for multiplication ("*"), or an operation code for operating XOR (eXclusive OR) which is exclusive-OR every bit ("xor");
creating and compressing, by the search client, a secure keyword acquired by encrypting an unciphered text keyword for a search using stochastic encryption, and transmitting, by the search client, the secure keyword to the management server via the network;
receiving, by the management server, the secure keyword via the network and searching the secure data and the secure keyword;
creating, by the search client, the secure keyword by encrypting the unciphered text keyword for a search, and making, by the search client, data acquired by masking a part of the secure keyword by a random number included in the secure keyword using the mask by the hash value and the output value of the homomorphic function;
searching, by the management server, the secure data and the secure keyword, making the secure data included in a part of a result of the search, and transmitting the result of the search to the search client via the network, without having the management server release a mask by random numbers of the secure data and the secure keyword;
receiving, by the search client, the result of the search transmitted via the network;
generating, by the registration client, a random number using an initial vector;
wherein the secure data includes the initial vector;
creating, by the registration client, intermediate encrypted data acquired by encrypting unciphered data;
creating, by the registration client, a main body of ciphertext acquired by masking the intermediate encrypted data using the random number and using the mask by the hash value and the output value of the homomorphic function;
wherein the secure data includes the main body of the ciphertext; and creating, by the registration client, the main body of ciphertext by encrypting each block that configures unciphered text of said each block by the random number and the search tag which is a hash value of a homomorphic function value of the random number ($H(F(r_i))$).

10. The non-transitory computer readable storage medium according to claim 9, wherein the method further includes:
generating, by the search client, the same random number as the random number generated by the registration client using the initial vector embedded in the secure data.

11. The non-transitory computer readable storage medium according to claim 10, wherein the method further includes:
generating, by the search client, the random number generated by the registration client using the initial vector embedded in the secure data;
wherein a mask of the random number that masks the main body of the ciphertext using the mask by the hash value and the output value of the homomorphic function is released.

12. The non-transitory computer readable storage medium according to claim 10, wherein the method further includes:
comparing, by the search client, the main body of the ciphertext from which the mask of the random number is released and the secure keyword.

13. The non-transitory computer readable storage medium according to claim 9, wherein the method further includes:
creating, by the registration client, the search tag having a different length from the tag length stored in the data storage for the secure data.

* * * * *